United States Patent [19]

Akao

[11] Patent Number: 5,118,563
[45] Date of Patent: Jun. 2, 1992

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Minami-Ashigara, Japan

[21] Appl. No.: 245,895

[22] Filed: Sep. 19, 1988

[30] Foreign Application Priority Data

Sep. 18, 1987 [JP] Japan .................. 62-234060

[51] Int. Cl.$^5$ ................................................ B32B 7/12
[52] U.S. Cl. .................... 428/334; 428/349; 428/461; 428/516; 428/910; 428/913
[58] Field of Search ............ 428/461, 910, 349, 516, 428/913, 334

[56] References Cited

U.S. PATENT DOCUMENTS

| | | | |
|---|---|---|---|
| 4,147,291 | 4/1979 | Akao et al. | 229/55 |
| 4,258,848 | 3/1981 | Akao et al. | 206/524.2 |
| 4,331,725 | 5/1982 | Akao | 428/138 |
| 4,337,285 | 6/1982 | Akao et al. | 428/35 |
| 4,356,224 | 10/1982 | Akao et al. | 428/220 |
| 4,359,499 | 11/1982 | Akao et al. | 428/201 |
| 4,386,124 | 5/1983 | Akao | 428/35 |
| 4,411,943 | 10/1983 | Akao | 428/161 |
| 4,411,945 | 10/1983 | Akao et al. | 428/214 |
| 4,436,809 | 3/1984 | Akao et al. | 430/501 |
| 4,452,846 | 6/1984 | Akao | 428/220 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/511 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 428/35 |
| 4,639,386 | 1/1987 | Akao | 428/35 |
| 4,653,640 | 3/1987 | Akao | 206/455 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |
| 4,708,896 | 11/1987 | Akao | 428/220 |
| 4,730,778 | 3/1988 | Akao et al. | 242/68.7 |
| 4,778,712 | 10/1988 | Akao | 428/213 |

Primary Examiner—Edith Buffalow
Attorney, Agent, or Firm—Burns, Doane, Swecker & Mathis

[57] ABSTRACT

A packaging material for photosensitive materials which comprises an uniaxially molecularly oriented thermoplastic resin film layer, an ethylene copolymer resin film layer containing more than 10 wt. % of ethylene copolymer resin, a substance having antiblocking action and an antioxidant and having a melting point of lower than said uniaxially molecularly oriented thermoplastic resin film layer, and a metallized biaxially molecularly oriented thermoplastic resin film layer interposed between said uniaxially molecularly oriented thermoplastic resin film layer and said ethylene copolymer resin film layer.

The packaging material of the invention hardly curls, and it is excellent in tear strength and heat sealing properties. Moreover, when the package is severely shaken during transportation, moistureproofness and lint-free ability can be still secured.

6 Claims, 1 Drawing Sheet

PACKAGING MATERIAL FOR PHOTOSENSITIVE MATERIALS

BACKGROUND OF THE INVENTION

1. Field of the Invention

This invention relates to a packaging material suitable for photographic photosensitive materials.

2. Description of the Prior Art

Various types of packaging materials for photosensitive materials have been put to practical use, and various properties are required according to their uses.

As a packaging material for photosensitive materials, it is necessary to have various properties such as packaging material slitability, light-shielding, gas barrier, moistureproofness, antistatic property, rigidity, physical strength such as breaking strength, tear strength, impact puncture strength, Gelbo test strength and wear resistance, heat sealing properties such as heat seal strength, side welding (cut-sealability), hot tack properties (hot-sealability) and sealability of contraries, flatness, slipping character and the like.

Conventional packaging materials for photosensitive materials are a single layer film of high pressure branched low density polyethylene (LDPE) blended with carbon black, a composite laminated film composed of a LDPE resin film and a flexible sheet, such as paper or aluminum foil. An example of a conventional packaging material is, as illustrated in FIG. 8, composed of a LDPE resin film layer 12a containing a light-shielding material, a aluminum foil layer 11 and a bleached kraft paper layer 10 laminated in this order each through an adhesive layer 6.

As the packaging material, particularly a sealed light-proof bag, for a heavy roll or sheets of photographic photosensitive materials, the inventor has already disclosed a laminated film composed of a cross laminated film of uniaxially stretched high density polyethylene (HDPE) resin films excellent in physical strength and a LDPE resin film containing at least a light shielding material or an antistatic agent laminated thereto (Japanese Utility Model KOKOKU No. 19087/1981), and another packaging material also having a cross laminated film of which heat sealing properties and light-shielding ability are improved (Japanese Utility Model KOKOKU No. 20590/1986).

Another packaging material developed by the inventor is a laminated film having a film layer composed of linear low density polyethylene (L-LDPE) resin which is excellent in physical strength and heat sealing properties and is inexpensive that is blended with carbon black (U.S. Pat. No. 4,701,359 and Japanese Patent KOKAI No. 18547/1987).

As the packaging material having a metallized film, the inventor has already disclosed a packaging material for photosensitive materials composed of a metallized film layer and two L-LDPE resin polymer layers containing more than 50 wt. % of L-LDPE resin laminated on both sides thereof. At least, one of the L-LDPE resin polymer layers contains 0.3 to 30 wt. % of a light shielding material (U.S. Pat. No. 4,663,218).

The aforementioned conventional laminated film having a LDPE resin film layer is inferior in physical strength, such as tear strength, in spite of being thick, and in heat sealing properties. As a result, it was punctured, or the heat sealed portion was separated, during packaging or transportation. Since physical strength such as tear strength and tensile strength is remarkably improved by using the cross laminated film, the packaging materials containing the cross laminated film are suitable for heavy materials. Therefore, they were put to practical use up to recently. However, since the uniaxally stretched HDPE resin film layer is used as a heat seal layer, heat sealing properties are inferior. Moreover, physical strength varied due to unequal thickness of the adhesive layer and an unequal draw ratio. As a result, it was occasionally separated or punctured, and curling and twisting also occurred. The cross laminated film is expensive, because two kinds of film molding machines are necessary. The packaging materials having a L-LDPE resin film layer blended with carbon black are excellent in tear strength, impact puncture strength, heat sealing properties and the like, and they are suitable for packaging photosensitive materials. However, in the case of packaging heavy materials or materials having sharp edges, the packaging material were occasionally elongated due to a low Young's modulus, and thereby, light-shielding and moistureproofness were insufficient. The packaging material of U.S. Pat. No. 4,663,218 was improved in physical strength such as tear strength. However, when the L-LDPE resin film layer containing a light-shielding material was laminated on only one side of the metallized film layer, the packaging material was greatly curled. Moreover, when no antiblocking agent nor lubricant was blended into the layer, blocking occurred. Therefore, it has been put to practical use in a form that two L LDPE resin film layers were laminated on both sides of an aluminum vacuum metallized nylon film or polyester film having a large Young's modulus and heat resistance, though it was expensive.

SUMMARY OF THE INVENTION

An object of the invention is to provide a packaging material for photosensitive materials that resists curling and excellent in physical strength such as tear strength, tensile strength, bursting strength and impact puncture strength.

Another object of the invention is to provide a packaging material for photosensitive materials excellent in heat sealing properties such as heat resistance of outer layer, heat seal strength, heat seal tolerance, hot tack properties, sealability of contraries, elapsed heat seal strength and sealability in low temperature.

Another object of the invention is to provide a packaging material for photosensitive materials excellent in moistureproofness, lint-free property, light-shielding ability and little blocking.

The present invention provides a packaging material for photosensitive materials achieving such objects, which comprises an uniaxially molecular oriented thermoplastic resin film layer, an ethylene copolymer resin film layer containing more than 10 wt. % of ethylene copolymer resin, a substance having antiblocking action and an antioxidant and having a melting point of lower than said uniaxially molecular oriented thermoplastic resin film layer, and a metallized biaxially molecular oriented thermoplastic resin film layer interposed between said uniaxially molecular oriented thermoplastic resin film layer and said ethylene copolymer resin film layer.

DETAILED DESCRIPTION OF THE INVENTION

Figure 1:
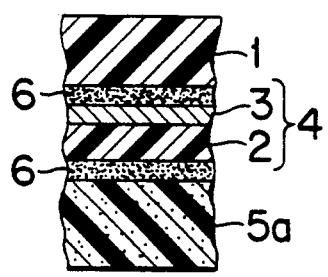
FIGS. 1 to 5 are partial sectional views of the packaging materials of photosensitive materials embodying the invention.

The representative uniaxially molecularly oriented films are uniaxially stretched films, and however, the uniaxially molecularly oriented film may also be prepared by using an apparatus to orient molecules in an uniaxial direction. In a suitable uniaxially molecularly oriented film, the tear strength in the direction of molecular orientation axis is twice or more stronger than the tear strength in the direction perpendicular to the molecular orientation axis. The uniaxially stretched films having a draw ratio of three times or more are particularly preferable in view of securing Young's modulus, heat resistance, wear resistance, bursting strength and the like. The direction of molecular orientation axis may be the lateral direction, longitudinal direction or oblique direction. Suitable thermoplastic resins for composing the uniaxially molecularly oriented film are polyolefin resins, polyester resins, polyamide resins, polycarbonate resins, and the like. A preferable uniaxially molecularly oriented film is a laterally or obliquely arranged uniaxially molecularly oriented HDPE resin film having a thickness of more than 7 μm. A suitable thickness of the uniaxially molecular oriented film layer is in the range of 10 to 70 μm. Suitable commercial films include "Caralyan Film" (Toyo Chemical Co., Ltd.) being a laterally uniaxially molecularly oriented film and "KM Film" (Mitsui Petrochemical Industries Co., Ltd.) being a obliquely uniaxially molecularly oriented film. As the manufacturing method of a laterally uniaxially molecularly oriented film, there are tentering method, inflation method, and the like, and the film prepared by any method is applicable to the packaging material of the invention. On the other hand, representative manufacturing methods of a obliquely uniaxially molecularly oriented film are disclosed in Japanese Patent KOKAI Nos. 34656/1972, 100464/1973, 127725/1984 and 122726/1984, Japanese Patent KOKOKU Nos. 5319/1965, 38621/1972, 39927/1972 and 18072/1978, U.S. Pat. No. 3,322,613 and the like. However, the manufacturing method of the film used for the packaging material of the invention is not limited to the above methods.

The ethylene copolymer resin film layer contains ethylene copolymer resin, a substance having antiblocking action and an antioxidant.

The ethylene copolymer resin may be selected from L-LDPE resin, ethylene-vinyl acetate copolymer (EVA) resin, ethylene ethylacrylate copolymer (EEA) resin, ethylene-methylacrylate copolymer (EMA) resin, ethylene-acrylic acid copolymer (EAA) resin, ionomer resin and the like. L-LDPE resin is preferable in view of tear strength, film moldability, impact puncture strength, cost and the like.

The L-LDPE resin is a copolymer of ethylene and α-olefin and it has a linear structure having short branches. The number of carbon atoms of the α-olefin is 3–13, preferably 4–8, more preferably 6–8, and examples are butene-1, 4-methylpentene-1, hexene-1, heptene-1 and octene-1. Preferable α-olefins are 4-methylpentene-1, hexene-1, heptene-1 and octene-1. Suitable ethylene content of L-LDPE is 85–99.5 mol. %, i.e. an α-olefin content is 0.5–15 mol. %, and preferred ethylene content is 90–99.5 mol. %, i.e. α-olefin content is 0.5–10 mol. %. The density is usually in the range of 0.87–0.95 g/cm$^3$, preferably 0.88–0.93 g/cm$^3$ (ASTM D-1505), and the melt index (M.I.) is more preferably 0.8–30 g/10 minutes, preferably 1–7 g/10 minutes (ASIM D-1238). Such a L LDPE resin is manufactured by solution method, slurry method, vapor phase method, or modified high pressure method. Examples of L-LDPE resin are "G-RESIN", "NUC-FLX" and "TUFLIN" (trade name, UCC), "NUC Polyethylene LL" and "TUFTHENE" (Nippon Unicar Co., Ltd.), "DOWLEX" (trade name, Dow Chemical Co., Ltd.), "STAMILEX" (trade name, DSM), "MORETEC" (Idemitsu Petrochemical Co., Ltd ), "SUCLEAR" (trade name, Dupont de Nemour, Canada), "MARLEX" (trade name, Phillips Co., Ltd.), "ULTZEX" and "NEOZEX" (trade name, Mitsui Petroleum Chemical Industries Co., Ltd.) and "NISSEKI LINIREX" (trade name, Nippon Petrochemicals Co., Ltd.).

The content of the ethylene copolymer resin in this film layer in more than 10 wt. %. When the content is less than 10 wt. %, physical strength is insufficient and heat sealing properties are inferior. Particularly, in the case of rising a lubricant as the substance having antiblocking action, heat seal strength decreases due to the bleeding out of the lubricant. A preferable content of the ethylene copolymer resin is more than 20 wt. %, more preferably more than 50 wt. %. The upper limit of the content is 99.9 wt. % or less, and it varies according the kind of the ethylene copolymer resin, the substance having antiblocking action, the antioxidant and the like.

Two or more kinds of the ethylene copolymer resins may be combined, and other resin(s) may be blended with the ethylene copolymer resin. Suitable resins for blending include LDPE resin, MDPE resin, HDPE resin, homopolypropylene resin, propylene-α-olefin random copolymer resin, modified ethylene copolymer resin, modified polyethylene resin, modified polypropylene resin, polyamide resin, polyester, synthetic rubber, saponified ethylene-vinyl acetate copolymer resin, elastomer, etc.

The substance having antiblocking action is not limited to an antiblocking agent, and includes a light-shielding material, lubricant and the like exhibiting antiblocking action in the blended state. For example, when HDPE resin is blended, antiblocking effect is great. Blocking can be prevented by blending more than 5 wt. % of HDPE resin having a density of more than 0.940 g/cm$^3$.

The antiblocking agent includes inorganic antiblocking agents such as silica, calcium silicate, calcium carbonate, aluminum silicate and talc, and organic antiblocking agents such as higher fatty acids, polyvinyl esters and dicarboxylic acid ester amides.

The light shielding material exhibiting antiblocking action in the blended state includes various carbon blacks, graphite, iron oxide, zinc white, titanium oxide, clay, aluminum powder, aluminum paste, calcium carbonate, mica, barium sulfate, talc, cadmium pigments, red iron oxide, cobalt blue, copper-phthalocyanine pigments and aniline black. Among these, a preferable light-shielding material is carbon black, and a particularly preferable substance is oil furnace carbon black having a pH of 5 to 9 and a mean particle size of 10 to 120 mμ, particularly having a pH of 6 to 9 and a mean particle size of less than 80 mμ. By using the carbon black of such pH and particle size, a packaging material having the following merits is obtained. That is, the occurrence of fogging is rare, increase or decrease of photosensitivity rarely occurs, light-shielding ability is great, the lumps of carbon black and pinholes such as fish eyes hardly occur, and physical strength and heat sealing properties are improved. There are various methods for blending a light-shielding material, the masterbatch is preferable in view of cost, not staining the working place, etc.

As the preferable light-shielding material, metal powder is in second place. Metal powder is a light-reflective light shielding material. It imparts a silver appearance, and it is excellent in moistureproofness, light shielding, antistatic property, thermal shielding in the sunlight and gas barrier. As the metal powder, aluminum powder and its paste are preferable. The paste of aluminum powder is produced by adding mineral spirits and a small amount of a higher fatty acid such as stearic acid or oleic acid to form paste at the production of aluminum powder according to a known method such as using a ball mill, a stamp mill or an atomizer. A polyolefin thermoplastic resin, such as various polypropylene resins, various polyethylene resins, EVA resin, EEA resin and EAA resin, etc. is kneaded together with this aluminum paste under heating, and volatile components mainly mineral spirits are removed by a vacuum pump. This product is used as aluminum paste compound resin or aluminum paste masterbatch resin. The aluminum paste masterbatch resin is preferable because of eliminating bad odors and adverse influence upon the photographic photosensitive materials. In order to eliminate bad odors and adverse influence upon the photographic photosensitive materials, the content of mineral spirits should be less than 0.1 wt. %. When the aluminum paste content of coextruded double layer film is made 2 wt. % by using a masterbatch resin containing 40 wt. % of aluminum paste and 1.0 wt. % of mineral spirits, one part by weight of the masterbatch resin is blended with 19 parts by weight of the main resin. Since a part of mineral spirits evaporates during molding, the final content of the mineral spirits is less than 0.05 wt. %. The aluminum powder includes microflakes produced from aluminum foil which is crushed by a ball mill or a stamp mill, in addition to usual aluminum powder manufactured by atomization, dropping on a rotary disc or evaporation from melted aluminum. Since aluminum powder is unstable, it is stabilized by a known treatment. Particularly, when the surface of aluminum powder is treated with a higher fatty acid or a metal salt of higher acid, dispersibility and film moldability are improved.

The lubricant includes:

Oleic acid amide lubricants; "ARMOSLIP-CP" (Lion akzo Co., Ltd.), "NEWTRON" and "NEWTRON E-18" (Nippon Fine Chemical Co., Ltd.), "AMIDE-O" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; Dimethylpolysiloxanes, etc. (Shinetsu Chemical Co., Ltd., Toray Silicone Co., Ltd.), etc.

Alkylamine lubricants; "ELECTROSTRIPPER TS-2" (Kao Corp ) etc.

Preferable lubricants include the fatty acid amide lubricants having a number of carbon atoms of 8 to 50, preferably 15 to 35.

A particularly preferred lubricant is oleic acid amide lubricant because of not giving adverse influence upon photographic photosensitive materials and having a great antiblocking ability. Two or more lubricants may be combined.

A suitable content of the substance having antiblocking action is, 0.01 to 5 wt. % in the case of the antiblocking agent, 0.5 to 10 wt. % in the case of the light-shielding material, and 0.01 to 2 wt. % in the case of the fatty acid amide lubricants. While, in the case of the lubricant to impart relatively low slipperiness, such as metal salts of fatty acids, hydrocarbon compounds, fatty acids and fatty acid amides, a suitable content is 0.05 to 5 wt. %.

Suitable antioxidants are phenol antioxidants, sulfur containing antioxidants, phosphorus containing antioxidants and the like. The phenol antioxidants include n-octadecyl-3-(3',5'-di t-butyl 4'-hydroxyphenyl)propionate, 2,6-di-t-butyl-4-methylphenol, 2,6-di-t butyl-p-cresol (BHT), 2,2'-methylenebis(4-methyl-6-t-butylphenol), 4,4'-thiobis(3-methyl-6-t-butylphenol), 4,4'-butylidenebis(3-methyl-6-t-butylphenol), stearyl-β-(3,5-di-4-butyl -4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene and tetrakis methylene-3(3',5'-di-t-butyl-4'-hydroxyphenyl) propionate methane. The sulfur-containing oxidation inhibitors include dilauryl-3,3'-thiodipropionate, dimyristyl-3,3'-thiodipropionate, laurylstearylthiodipropionate, distearyl-3,3'thiodipropionate and ditridecyl-3,3'-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Particularly preferably antioxidants are phenol antioxidants. Two or more antioxidants may be combined. A suitable content of the antioxidant is in the range not adversely affecting photosensitive materials, i.e. 0.001 to 1 wt. %, irrespective of the case of single antioxidant or the case of a combination of two or more antioxidants. When the content is less than 0.001 wt. %, the blending effect hardly appears. While, when the content is beyond 1 wt. %, photographic film utilizing oxidatoin-reduction reaction is adversely influenced by antioxidant. In order to avoid the adverse influence, the content of antioxidant is a minimum amount capable of preventing coloring troubles and generation of lumps. When antioxidant is combined with carbon black, oxidation inhibition effect synergistically appears. To each layer of the packaging material of the invention, necessary amounts of various additives may be added according to required properties. Particularly, to add various antistatic agents and conductive materials are preferable in view of improving antistatic properties. Preferable antistatic agents are cationic antistatic agents and nonionic antistatic agents, and a suitable content is 0.1 to 2 wt. %.

The melting point (ASTM D2117) of the ethylene copolymer resin film layer is made so as to become lower than the uniaxially molecularly oriented thermoplastic resin film layer, preferably by 125° C. or further lower. By this relation, heat sealing properties are improved, i.e. the deformation and thermal degradation of the uniaxially molecularly oriented thermoplastic resin film layer disposed as the surface layer can be prevent at the time of heat sealing.

The thickness of the ethylene copolymer resin film layer is usually in the range of 15 to 120 $\mu$m. The ethylene copolymer resin film layer may be in a form of a coextruded multilayer film composed of the ethylene copolymer resin film layers alone or a combination of the ethylene copolymer resin film layer(s) and other thermoplastic resin film layer(s).

The metallized biaxially molecularly oriented thermoplastic resin film layer is composed of polyolefin resin, preferably polypropylene resin, polyethylene resin, polybutene resin or a mixture therof, polyester resin, polyamide resin, saponified EVA resin polycarbonate resin or polystyrene resin as the principal component. The metallic membrane layer may be formed of a pure metal such as Al, Sn, Zn, Co, Cr, Ni, Fe, Cu, etc., alloys thereof, or any other metals of which metallic membrane layer can be made, but aluminum is the most preferable in terms of processing and cost. An aluminum vacuum metallized biaxially stretched nylon film is a most suitable because of having a high Young's modulus and decreasing pinhole generation. A suitable thickness of the metallic membrane layer is 55 to 1,200 Å in view of physical strength, light-shielding ability, antistatic property, moistureproofness, cost and the like. In the case of aluminum-metallized membrane, preferable thickness is thicker than 70 Å, more preferably 80 to 800 Å, most preferably 100 to 600 Å. Metallization is carried out according to a known method, such as vacuum evaporation, sputtering, ion plating, or electron beam heating. A suitable thickness of the metallized biaxially molecularly oriented thermoplastic resin film layer is 7 to 50 $\mu$m.

The metallized biaxially molecularly oriented thermoplastic resin film layer is interposed between the uniaxially molecularly oriented thermoplastic resin film layer and the ethylene copolymer resin film layer.

The respective layers mentioned previously may be laminated according to a known method such as a heat sealing (hot bar sealing, Verneuil's method, impulse heat sealing, supersonic heat sealing, etc.) or the method using an adhesive (wet laminating, dry laminating, hot melt laminating, extrusion laminating, etc.).

The adhesive is selected by considering both layers to be joined, and includes thermoplastic resin melting adhesives including a polyolefin adhesive, hot melting type adhesive, gum adhesives and solution type adhesives. The polyolefin adhesives include a homopolymer and a copolymer of an olefin such as various polyethylenes, polypropylenes, polybutenes and ethylene propylene copolymers and ethylene-α-olefin copolymer (L-LDPE), a copolymer of an olefin and another monomer such as ethylene vinyl acetate copolymer, ethylene-acrylate ester copolymer, modified ethylene copolymer resin, modified polyethylene resin, modified polypropylene resin, various ionomers (ionic copolymer resins, "SURLYN" Dupont, "HIMIRAN" Mitsui Polychemicals Co., Ltd., etc.), adhesive polymer ("ADOMER", Mitsui Polychemicals Co., Ltd, "MODIC", Mitsubishi Petrochemical Co Ltd.) and a graft copolymer. The solution type adhesives are divided into adhesives for wet lamination and adhesives for dry lamination. The adhesives for wet lamination are emulsion-type adhesives or latex-type adhesives. Examples of the emulsion-type adhesives are polyvinyl acetate emulsion, the emulsion of vinyl acetate ethylene copolymer, the emulsion of vinyl acetate acrylate ester copolymer, the emulsion of vinyl acetate maleate ester copolymer, the emulsion of acrylic copolymer and the emulsion of ethylene-acrylic acid copolymer. Examples of the latex type adhesives are natural rubber latex, styrene-butadiene rubber latex, acrylonitrile butadiene rubber latex and chloroprene rubber latex. An example of the adhesives for dry lamination is polyurethane adhesive. Adhesives for hot melt lamination containing paraffin wax, microcrystalline wax, ethylene-vinyl acetate copolymer and ethylene-ethylacrylate copolymer, pressure-sensitive adhesives, temperature-sensitive adhesives and ultraviolet curing type adhesives may also be employed. Particularly preferable extrusion laminating adhesives are LDPE resin and L-LDPE resin due to their excellent laminating ability and inexpensiveness. Besides, blends of the foregoing resins as the adhesive so as to compensate for the defect of each resin is also particularly preferable. For example, when LDPE resin is blended with L-LDPE resin, laminating speed can be raised due to the improvement in extensibility and small neck in. Moreover, pinholes are decreased. The thickness of the adhesive layer formed by extrusion laminating using a thermoplastic resin is usually 6 to 50 $\mu$m, preferably 10 to 20 $\mu$m. However, the thickness is determined based upon cost, rate of application, thickness of the whole layers, and etc., and accordingly, the thickness is not limited to the above range. In the case that the resin temperature at the adhesion is set in the range of 200° to 380° C., laminating properties such as laminating ability and adhesive strength are improved, and pinholes are decreased. In addition, one of the aforementioned layers is preferably laminated so that the adhesive strength is less than 350 g/15 mm width.

The packaging material of the invention may be used for packaging photosensitive material such as photographic photosensitive materials, foods, medicines or chemical substances, and it is particularly suitable for packaging silver halide photographic photosensitive materials, diazo photographic photosensitive materials, photosensitive resins, self-developing type photographic photosensitive materials, diffusion transfer type photographic photosensitive materials and other photographic materials which are degraded by small amounts of moisture or gas.

The packaging form may be conventional, and includes a single-sheet flat bag, a double-sheet flat bag, a self-standing bag, a single-sheet gusset bag, a double-sheet gusset bag, inner lining for a moistureproof box, inner lining for a light room-loading light-shielding box and a leader paper. The sealing form may also be conventional, and includes heat sealing, side welding, impulse heat sealing, ultrasonic sealing and high frequency sealing. Sealing methods involving the use of an adhesive may also be utilized.

In the packaging material of the invention, the uniaxially molecularly oriented thermoplastic resin film layer and the metallized biaxially molecularly oriented thermoplastic resin film layer minimize curling. The ethylene copolymer resin film layer improves heat sealing properties and raises tear strength. The metallized biaxially molecularly oriented thermoplastic resin film layer 5 decreases frictional electrification and the temperature elevation by placing under sunlight. Moreover, the combination of these layers prevents bag rupture and the generation of dust, and secures moistureproofness and light shielding. Thus, the packaging materials of the invention hardly curls, and it is excellent in tear strength and heat sealing properties. Moreover, when the package is severely shaken during transportation, moistureproofness and lint-free ability can be still secured.

Representative embodiments of the packaging material of the invention are illustrated in FIGS. 1 to 5.

The packaging material of FIG. 1 is composed of the uniaxially molecularly oriented thermoplastic resin film layer 1, the metallized biaxially molecularly oriented thermoplastic resin film layer 4 consisting of a biaxially molecularly oriented thermoplastic resin film layer 2 and a metal membrane layer 3, and the ethylene copolymer resin film layer 5a containing a light-shielding material laminated in this order each through an adhesive layer 6.

Figure 2:
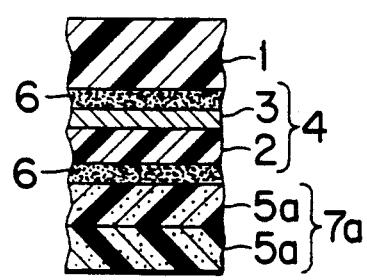

The packaging material of FIG. 2 is the same as the packaging material of FIG. 1, except that the ethylene copolymer resin film layer 5a is replaced by a coextruded multilayer film layer 7a consisting of two ethylene copolymer resin film layers 5a, 5a containing a light-shielding material.

Figure 3:
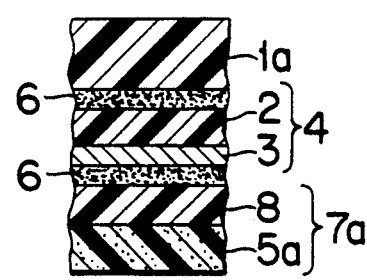

The packaging material of FIG. 3 is composed of the uniaxially molecularly oriented thermoplastic resin film layer 10 1a containing a light-shielding material, the metallized biaxially molecularly oriented thermoplastic resin film layer where the metal membrane layer 3 is disposed on the opposite side to the case of the packaging material of FIG. 1 and a coextruded multilayer film layer 7a consisting of a thermoplastic resin film layer 8 not containing ethylene copolymer resin and the ethylene copolymer resin film layer 5a containing a light shielding material laminated in this order each through an adhesive layer 6.

Figure 4:
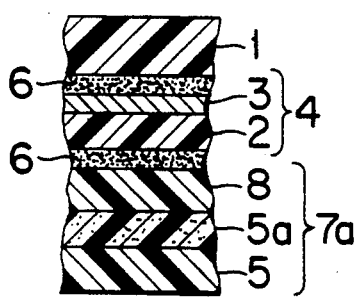

The packaging material of FIG. 4 is the same as the packaging material of FIG. 1, except that the ethylene copolymer resin film layer 5a is replaced by a coextruded multilayer film layer 7a consisting of a thermoplastic resin film layer 8 not containing ethylene copolymer resin, the ethylene copolymer resin film layer 5a containing a light-shielding material and the ethylene copolymer resin film layer 5 not containing a light shielding material.

Figure 5:
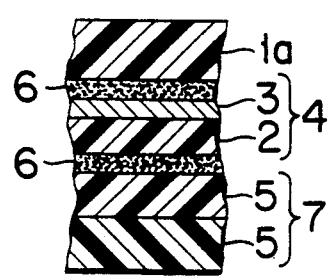

The packaging material of FIG. 5 is the same as the packaging material of FIG. 2, except that the uniaxially molecularly oriented thermoplastic resin film layer 1a contains a light shielding material, whereas neither of the two ethylene copolymer resin film layers 5,5 contains a light shielding material.

Figure 6:
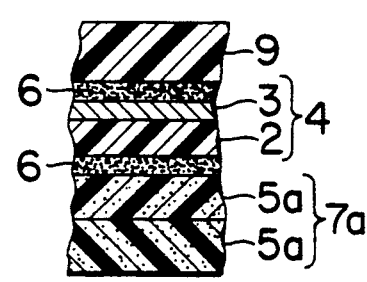
FIGS. 6 and 7 are partial sectional views of comparative packaging materials.
Figure 7:
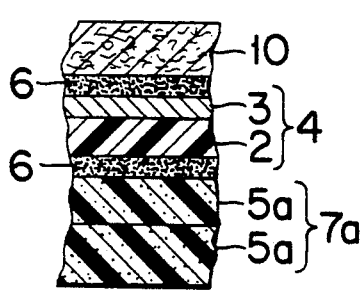

Two comparative packaging materials are illustrated in FIGS. 6 and 7.

The comparative packaging material of FIG. 6 is the same as the packaging material of FIG. 2, except that a biaxially stretched thermoplastic resin film layer 9 is laminated instead of the uniaxially molecularly oriented thermoplastic resin film layer 1.

The comparative packaging material of FIG. 7 is the same as the packaging material of FIG. 2, except that a bleached kraft paper 10 is laminated instead of the uniaxially molecularly oriented thermoplastic resin film layer 1.

EXAMPLES

The packaging material of Example I corresponds to the packaging material of FIG. 2. The uniaxially molecularly oriented thermoplastic resin film layer 1 was a laterally uniaxially stretched HDPE resin film layer 18 $\mu$m thick. The metallized biaxially molecularly oriented thermoplastic resin film layer 4 was an aluminum vacuum-metallized biaxially stretched nylon film layer consisting of a biaxially stretched nylon film layer 2 having a thickness of 15 $\mu$m and an aluminum membrane layer 3 having a thickness of 400 Å. The ethylene copolymer resin film layer 5a disposed on the adhesive layer 6 side was a high Young's modulus L LDPE resin film layer 30 $\mu$m thick composed of 76.9 wt. % of L-LDPE resin being ethylene-4-methylpentene-1 copolymer resin having a MI of 2.1 g/10 minutes and a density of 0.920 g/cm$^3$, 20 wt. % of HDPE resin having a MI of 1.1 g/10 minutes and a density of 0.954 g/cm$^3$, 3 wt. % of oil furnace carbon black having a mean particle size of 21 m$\mu$ and 0.1 wt. % of a phenol antioxidant. The other ethylene copolymer resin film layer 5a disposed as the surface layer was a L-LDPE resin film layer 40 $\mu$m thick composed of 96.8 wt. % of L-LDPE resin being ethylene-4-methylpentene-1 copolymer resin having a MI of 2.1 g/$^{10}$ minutes and a density of 0.920 g/cm$^3$, 3 wt. % of oil furnace carbon black having a mean particle size of 21 m$\mu$, 0.1 wt. % of a phenol antioxidant, 0.05 wt. % of a phosphorus-containing antioxidant and 0.05 wt % of oleic acid amide lubricant. The two ethylene copolymer resin film layers 5a, 5a were coextruded by a double layer coextruding inflation molding process. Each adhesive layer 6 was an extrusion laminating adhesive layer 13 $\mu$m thick composed of LDPE resin having a MI of 5.1 g/10 minutes and a density of 0.919 g/cm$^3$.

The packaging material of Example II also corresponds to the packaging material of FIG. 2. Respective layers were the same as the packaging material of Example I, except that the laterally uniaxially stretched HDPE resin film was replaced by a obliquely uniaxially molecular oriented HDPE resin film 50 $\mu$m thick manufactured by the equipment described in Japanese Patent KOKOKU No. 38306/1978.

Comparative packaging material I corresponds to the packaging material of FIG. 6. Respective layers were the same as the packaging material of Example I, except that a biaxially stretched polyester resin film 25 $\mu$m thick was used as the biaxially stretched thermoplastic resin film layer 9.

Comparative packaging material II corresponds to the packaging material of FIG. 7. Respective layers were the same as the packaging material of Example I, except that a breached kraft paper having an areal weight of 35 g/m$^2$ was used as the bleached kraft paper layer 10.

Figure 8:
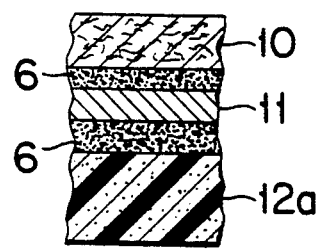
FIGS. 8 is a partial sectional view of a conventional packaging material.

Conventional packaging material I corresponds to the packaging material of FIG. 8. The bleached kraft paper layer 10 had an areal weight of 35 g/m$^2$, and the aluminum foil layer 11 had a thickness of 7 $\mu$m. The LDPE resin film layer 12a was composed of 97 wt. % of LDPE resin having a MI of 2.4 g/10 minutes and a density of 0.923 g/cm$^3$ and 3 wt. % of oil furnace carbon black having a mean particle size of 21 m$\mu$ manufactured by inflation process in a thickness of 70 $\mu$m. .

Each adhesive layer 6 had a thickness of 40 $\mu$m and was composed of LDPE resin having a MI of 5.1 g/10 minutes and a density of 0.919 g/cm³.

The layer compositions of the above packaging materials are compared in brief in Table 1. Various properties of the above films were measured, and the results are summarized in Table 2.

cording to JIS Z-0232, and the moistureproofness of the gusset bag was estimated.

Lint-Free Ability After Shaking: The dust generation degree of each gusset bag was estimated after the above vibration test according to JIS Z-0232.

Light-Shielding After Shaking: After the above vi-

TABLE 1

|  | Invention | | Comparative | | Conventional |
|---|---|---|---|---|---|
|  | I | II | I | II | I |
| Layer Composition | FIG. 2 | FIG. 2 | FIG. 6 | FIG. 7 | FIG. 8 |
| Outer Layer | Lateral HDPE*¹(18μ) | Oblique HDPE*²(50μ) | Biaxial Polyester*³(25μ) | Kraft Paper*⁴(35 g/m2) | " |
| Adhesive Layer | LDPE*⁵(13μ) | " | " | " | LDPE*⁵(40μ) |
| Intermediate Layer | Al-Biaxial Nylon*⁶(15μ) | " | " | " | Al Foil (7μ) |
| Adhesive Layer | LDPE*⁵(13μ) | " | " | " | LDPE*⁵(40μ) |
| Inner Layer | Double CB-Contg. L-LDPE Layer*⁷(70μ) | " | " | " | Single CB-Contg. LDPE Layer*⁸(70μ) |
| Total Thickness | 158μ | 130μ | 137μ | 148μ | 209μ |

*¹Laterally uniaxially stretched HDPE resin film
*²Obliquely uniaxially stretched HDPE resin film
*³Biaxially stretched polyester film
*⁴Bleached kraft paper
*⁵LDPE extrusion adhesive layer
*⁶Aluminum vacuum-metallized biaxially stretched nylon film
*⁷Coextruded double L-LDPE resin inflation film containing 3 wt. % of carbon black
*⁸Single LDPE resin inflation film containing 3 wt. % of carbon black

TABLE 2

|  | Invention | | Comparative | | Conventional |
|---|---|---|---|---|---|
|  | I | II | I | II | I |
| Curling | A | B | E | D-E | D |
|  | 0 cm | 0.2 cm | 16.8 cm | 9.2 cm | 7.3 cm |
| Tear Strength (MD) | 586 g | 468 g | 512 g | 642 g | 286 g |
| Tear Strength (CD) | 714 g | 593 g | 604 g | 1073 g | 348 g |
| Moisture-proofness After Shaking | A | A | A | B | E |
| Lint-Free Ability After Shaking | A | A | A | D | E |
| Light-Shielding After Shaking | A | A | A | B | E |
| Heat Sealing Properties | A | A | A | A | C |

Evaluations in Table 2 were carried out as follows:
A very excellent
B excellent
C practical
D having a problem
E impractical Testing methods were as follows:

Curling: A circular test piece having 10 cm in diameter was prepared from the film to be tested. The test piece was placed on a flat plate, and allowed to stand at 20 C at 65% RH for 24 hours without loading. The distance (l) between both ends was measured, and 10 l (cm) was used as the curling value.

Tear Strength: According to JIS P-8116

Moistureproofness After Shaking: Gusset bags were prepared from the film to be tested, and a roll of a color photographic printing paper having a size of 8.9 cm × 180 m was placed in each bag. Then, the gusset bag was heat-sealed, and four gusset bags containing the roll were placed in a corrugated board box. The vibration test was applied to the corrugated board box acbration test according to JIS Z-0232, each gusset bag was exposed to the light of 80,000 luxes for 5 hours, the light shielding ability was estimated by the fogging degree of the color photographic printing paper after developing in a dark room.

Heat Sealing Properties: Judged by total heat seal properties including heat seal strength, hot tack properties, sealability with contrasting material, elapsed heat seal strength and heat seal temperature tolerance.

I claim:

1. A packaging material for photosensitive materials which comprises uniaxially molecular oriented thermoplastic resin film layer which is a laterally or obliquely arranged uniaxially molecularly oriented HDPE resin film having a thickness of more than 10 μm, an ethylene copolymer resin film layer containing more than 10 wt. % of ethylene copolymer resin, a substance having antiblocking action and an antioxidant and having a melting point of lower than said uniaxially molecularly oriented thermoplastic resin film layer interposed between said uniaxially molecularly oriented thermoplastic resin film layer, and a metallized biaxially molecularly oriented thermoplastic resin film layer and said ethylene copolymer resin film layer.

2. The packaging material of claim 1 wherein said uniaxially molecularly oriented thermoplastic resin film is an uniaxially stretched thermoplastic resin film having a draw ratio of three times or more.

3. The packaging material of claim 1 wherein said ethylene copolymer resin is L-LDPE resin.

4. The packaging material of claim 1 wherein said substance having antiblocking action is an antiblocking agent.

5. The packaging material of claim 1 wherein said substance having antiblocking action is carbon black, aluminum powder or a fatty acid amide lubricant.

6. The packaging material of claim 1 wherein said metallized biaxially molecularly oriented thermoplastic resin film layer is aluminum vacuum metallized biaxially stretched nylon film.

* * * * *